United States Patent [19]

Kobayashi et al.

[11] Patent Number: 4,743,961
[45] Date of Patent: May 10, 1988

[54] DIGITAL CHROMINANCE SIGNAL PROCESSING SYSTEM

[75] Inventors: Yuji Kobayashi; Tsutomu Takamori, both of Kanagawa, Japan

[73] Assignee: Sony Corporation, Tokyo, Japan

[21] Appl. No.: 854,508

[22] Filed: Apr. 22, 1986

Related U.S. Application Data

[63] Continuation of Ser. No. 818,208, Jan. 13, 1986, abandoned.

[30] Foreign Application Priority Data

Jan. 31, 1985 [JP] Japan .................................. 60-017130

[51] Int. Cl.$^4$ .............................................. H04N 9/64
[52] U.S. Cl. ...................................... 358/40; 358/13; 358/36
[58] Field of Search ......................... 358/13, 23, 36, 40

[56] References Cited

U.S. PATENT DOCUMENTS

| | | | |
|---|---|---|---|
| 3,588,321 | 6/1971 | Bruch | 358/21 R |
| 4,352,122 | 9/1982 | Reitmeier et al. | 358/13 |
| 4,419,687 | 12/1983 | Dischert et al. | 358/13 |
| 4,456,927 | 6/1984 | Marin | 358/21 R |
| 4,464,686 | 8/1984 | Reitmeier | 358/36 |
| 4,502,074 | 2/1985 | Reitmeier | 358/23 |
| 4,527,188 | 7/1985 | Lewis | 358/23 |
| 4,689,660 | 8/1987 | Kashigi | 358/13 |

FOREIGN PATENT DOCUMENTS 3488 1/1983 Japan ...................................... 358/19

OTHER PUBLICATIONS

J. H. Taylor, Digital Sub-Nyquist Filters IBA Technical Review, Jan. 1979.
Hashimoto et al., Digital Separation and Reconstruction of NTSC Signals, IEEE Transactions on Communications vol. COM 28 No. 7 Jul. 1980 pp. 1085–1088.

*Primary Examiner*—John W. Shepperd
*Attorney, Agent, or Firm*—Alvin Sinderbrand

[57] ABSTRACT

A digital chrominance signal processing system for processing an input digital composite chrominance signal, which is sampled with a sampling frequency $f_s = 2mf_{sc}$, wherein m is an integer and $f_{sc}$ is a color subcarrier frequency, has a decoder for decoding the input digital composite chrominance signal into digital chrominance components, the decoder including a code converter for inverting the input digital composite chrominance signal and a switch for selectively switching between the input digital composite chrominance signal and an output of the code converter at a switching rate $mf_{sc}$.

3 Claims, 5 Drawing Sheets

DIGITAL CHROMINANCE SIGNAL PROCESSING SYSTEM

CROSS-REFERENCE TO RELATED APPLICATION

This application is a continuation of our pending U.S. patent application Ser. No. 818,208, filed Jan. 13, 1986, now abandoned.

BACKGROUND OF THE INVENTION

1. Field of the Invention

This invention relates to a phase control circuit for a digital chrominance signal, for example, for use in a drop-out compensation circuit, a variable speed reproducing circuit and so on.

2. Description of the Prior Art

It is frequently required to control a phase of a video signal in the recording and reproducing thereof, such as in a drop-out compensation circuit and in a hue control circuit.

FIG. 1 shows one example of a drop-out compensation circuit which is used in a reproducing circuit of a VTR (video tape recorder) and which is disclosed in greater detail in U.S. Pat. No. 3,463,874.

Referring to FIG. 1, a reproduced video signal which is supplied to an input terminal 101 is supplied to a switch 102 and to an Y/C separator 103 from which a luminance signal Y and a chrominance signal C are separately derived. The separated luminance and chrominance signals are supplied to 1H (H is the horizontal period) delay lines 104 and 105, respectively. The delayed chrominance signal is supplied to a chroma inverter 110 in which the phase of the subcarrier thereof is inverted and the resulting inverted chrominance signal C' is then combined with the luminance signal Y by an adder 106.

The combined video signal is supplied to one of two fixed contacts of a switch 102, and the other of the fixed contacts is connected to input terminal 101. When a drop-out occurs, the switch 102 is controlled such that the movable contact thereof is disposed in the illustrated position, that is, connected to the output side of the adder 106 to thereby provide at the output of switch 102, a compensation video signal having no drop-out. The reason why the phase-inverted chrominance signal is used when the drop-out occurs is that the phase of the chrominance signal is inverted or changed by 180° at each successive line (H).

FIG. 2 shows one example of the chroma inverter 110 that may be used in the aforesaid drop-out compensation circuit. Such chroma inverter, as disclosed in U.S. Pat. No. 3,564,123, comprises input and output transformers 111 and 112, with the chrominance signal C being supplied to a terminal 113 of the input transformer 111 and a chrominance signal C', the phase of which is inverted, as required, being developed at a terminal 114 of the output transformer 112.

Between the input and output transformers 111 and 112, there are provided 4 switching diodes $D_1$ to $D_4$ connected as shown in FIG. 2. When a command signal applied to a terminal 115 is at "L" (low) level, the diodes $D_1$ and $D_2$ are turned on, while the diodes $D_3$ and $D_4$ are turned off. When, on the other hand, the command signal is at "H" (high) level, the diodes $D_1$ and $D_2$ are turned off, while the diodes $D_3$ and $D_4$ are turned on. Consequently, the chrominance signal applied to the input side of the output transformer 112 is made to have an opposite polarity to the preceding polarity so that when the command signal is at "H" level, the phase-inverted chrominance signal C' is developed at the output terminal 114.

With the conventional chroma inverter of FIG. 2, it is only possible to provide the chrominance signal with the phase 0 or $\pi$ by controlling the polarity of the command signal. Accordingly, although the chroma inverter of the described type can be applied to a dropout compensation circuit for a chrominance signal of NTSC format, it cannot be used for a chrominance signal of PAL format which requires a phase shift of $\pi/2$. Therefore, the described conventional chroma inverter cannot be universally used and also such construction of the conventional chroma inverter is not suitable for digital signal processing.

OBJECTS AND SUMMARY OF THE INVENTION

Accordingly, it is an object of this invention to provide a digital chrominance signal processing system which avoids the above mentioned disadvantages of the prior art.

It is another object of this invention to provide a digital chrominance signal processing system for digitally processing an input digital composite chrominance signal so as to provide a chrominance signal having a desired phase.

According to one aspect of the present invention, there is provided a system for processing an input digital composite chrominance signal which is sampled with a sampling frequency $f_s=2mf_{sc}$, wherein m is an integer and $f_{sc}$ is a color subcarrier frequency, comprising: means for decoding said input digital composite chrominance signal into digital chrominance components and which includes a code converter for inverting said input digital composite chrominance signal and means for selectively switching between said input digital composite chrominance signal and an output of said inverting means at a switching rate $mf_{sc}$.

According to another aspect of the present invention, there is provided a system for processing an input digital composite chrominance signal which is sampled with a sampling frequency $f_s=2mf_{sc}$, comprising: decoder means for converting said input digital composite chrominance signal into digital chrominance components and including first inverting means for inverting said input digital composite chrominance signal, first switch means for switching between said input digital composite chrominance signal and an output of said inverting means at a first switching rate of $mf_{sc}$, second switch means for distributing an output of said first switch means into said digital chrominance components and being switched at a second switching rate of $2mf_{sc}$, and means for transmitting the digital chrominance components from said decoder means; and encoder means for converting said digital chrominance components into an output digital composite chrominance signal, said encoder means including third switch means for serially producing said digital chrominance components from said transmitting means and being switched at said second switching rate, second inverting means for inverting an output of said third switch means and fourth switch means for switching between the outputs of said second inverting means and said third switch means at said first switching rate.

The above, and other objects, features and advantages of the present invention, will become apparent from the following detailed description of preferred embodiments thereof which is to be read in conjunction with the accompanying drawings, throughout which like reference numerals designate like elements and parts.

DESCRIPTION OF THE PREFERRED EMBODIMENTS

In accordance with the present invention, a predetermined phase difference $\theta$ can be provided by digital processing. However, for the sake of convenience in explaining the principles underlying this invention, a phase control operation by analog processing will be first described in detail with reference to FIG. 3.

If a composite video signal referred to as S(t), S(t) is expressed as $$S(t) = y(t) + c(t) \quad (1)$$
$$= y(t) + c_1(t)\cos(\omega_{sc}t + \theta_0) + c_2(t)\sin(\omega_{sc}t + \theta_0)$$

where y(t) is the luminance signal, c(t) is the chrominance signal, $c_1(t)$ and $c_2(t)$ are the color signals $c_1$ and $c_2$, $\omega_{sc}$ is the angular frequency of the color subcarrier ($=2\pi f_{sc}$) and $f_{sc}$ is the subcarrier frequency, and $\theta_0$ is the initial phase of the subcarrier.

When the color signals $c_1(t)$ and $c_2(t)$ are of the NTSC format, they are expressed as $$c_1(t) = U \text{ axis component} = B - Y/2.03 \brace c_2(t) = V \text{ axis component} = R - Y/1.14 \quad (2)$$

where B−Y and R−Y represent the blue and red color difference signals, respectively.

If the color signals $c_1(t)$ and $c_2(t)$ are of PAL format, the condition of $c_2(t)=\pm V$ axis component is established.

Figure 1:
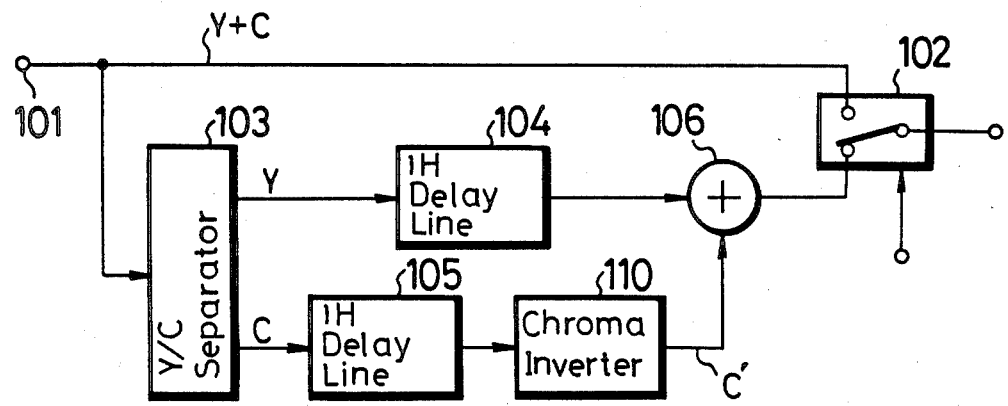
FIG. 1 is a block diagram showing a prior art drop-out compensation circuit which is used in a reproducing circuit of a VTR (video tape recorder)
Figure 2:
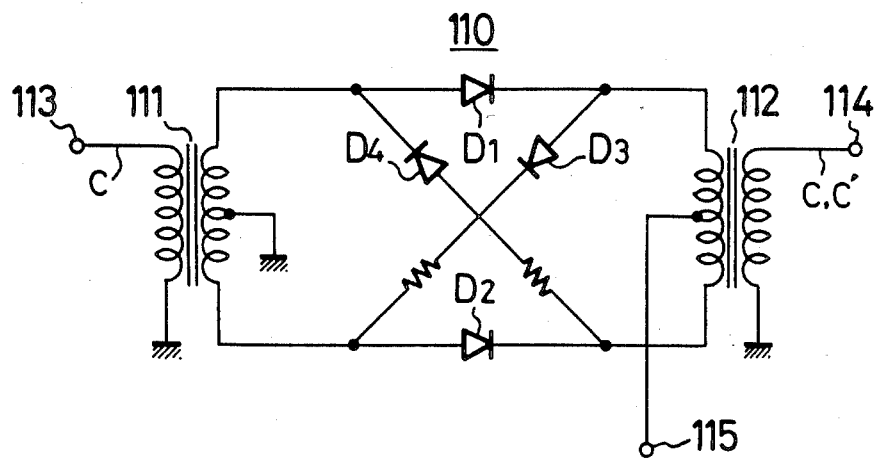
FIG. 2 is a diagram showing one example of a prior art chroma inverter used in the drop-out compensation circuit of FIG. 1.
Figure 3:
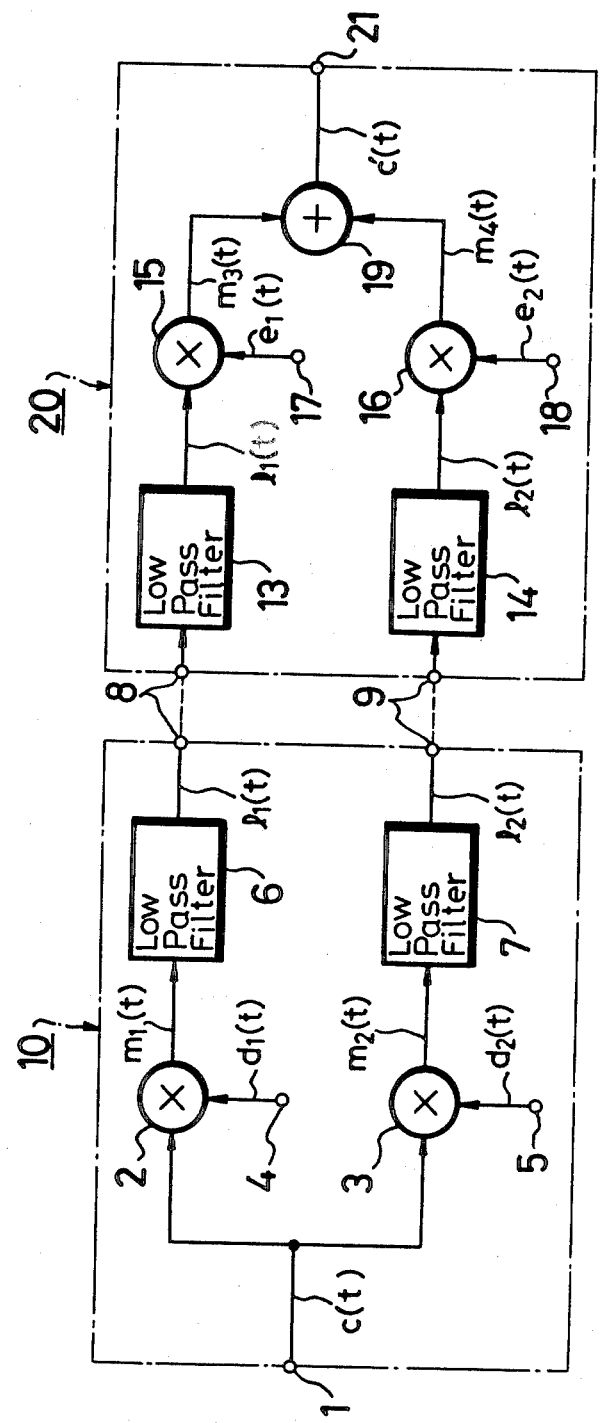
FIG. 3 is a circuit diagram used to explain the phase control operation according to this invention, but in an analog processing environment for ease of explanation.

In FIG. 3, the chrominance signal c(t) resulting from the Y/C separation is supplied to an input terminal 1 of a decoder 10. Specifically, the chrominance signal c(t) applied to terminal 1 is supplied to first and second multipliers 2 and 3. These multipliers 2 and 3 are also supplied from terminals 4 and 5 with first and second decode carriers $d_1(t)$ and $d_2(t)$, which are expressed by the following Eqs. (3) and (4):

$$d_1(t) = 2\cos(\omega_{sc}t + \theta_1) \quad (3)$$

$$d_2(t) = 2\sin(\omega_{sc}t + \theta_1) \quad (4)$$

where $\theta_1$ represents the initial phase of the decode carrier.

Accordingly, multipliers 2 and 3 provide first and second multiplied outputs $m_1(t)$ and $m_2(t)$ which are expressed as $$\begin{aligned}
m_1(t) &= 2c(t)\cos(\omega_{sc}t + \theta_1) \\
&= 2c_1(t)\cos(\omega_{sc}t + \theta_1)\cos(\omega_{sc}t + \theta_1) + \\
&\quad 2c_2(t)\sin(\omega_{sc}t + \theta_1)\cos(\omega_{sc}t + \theta_1) \\
&= c_1(t)\{\cos(2\omega_{sc}t + \theta_0 + \theta_1) + \cos(\theta_0 - \theta_1)\} + \\
&\quad c_2(t)\{\sin(2\omega_{sc}t + \theta_0 + \theta_1) + \sin(\theta_0 - \theta_1)\} \\
&= c_1(t)\{\cos(2\omega_{sc}t \cdot \cos(\theta_1 + \theta_1) - \\
&\quad \sin 2\omega_{sc}t \cdot \sin(\theta_0 + \theta_1) + \cos(\theta_0 - \theta_1)\} + \\
&\quad c_2(t)\{\sin(2\omega_{sc}t \cdot \cos(\theta_0 + \theta_1) + \\
&\quad \cos 2\omega_{sc}t \cdot \sin(\theta_0 + \theta_1) + \sin(\theta_0 - \theta_1)\}
\end{aligned} \quad (5)$$

$$\begin{aligned}
m_2(t) &= 2C(t)\sin(\omega_{sc}t + \theta_1) \\
&= c_1(t)\{\cos 2\omega_{sc}t \cdot \sin(\theta_0 + \theta_1) + \\
&\quad \sin 2\omega_{sc}t \cdot \cos(\theta_0 + \theta_1) - \sin(\theta_0 + \theta_1)\} + \\
&\quad c_2(t)\{\sin 2\omega_{sc}t \cdot \sin(\theta_0 + \theta_1) - \\
&\quad \cos 2\omega_{sc}t \cdot \cos(\theta_0 + \theta_1) - \cos(\theta_0 + \theta_1)\}
\end{aligned} \quad (6)$$

These calculated outputs $m_1(t)$ and $m_2(t)$ are respectively supplied to low pass filters 6 and 7 in which the items containing $2\omega_{sc}t$ (high frequency band components) are removed from each of the calculated outputs. Accordingly, decoded outputs $l_1(t)$ and $l_2(t)$ developed at terminals 8 and 9 become $$l_1(t) = c_1(t)\cos(\theta_0 - \theta_1) + c_2(t)\sin(\theta_0 + \theta_1) \quad (7)$$

$$l_2(t) = -c_1(t)\sin(\theta_0 - \theta_1) + c_2(t)\cos(\theta_0 + \theta_1) \quad (8)$$

When the decode carriers $d_1(t)$ and $d_2(t)$ having the initial phase $\theta_1$ and represented by Eqs. (3) and (4), respectively, are multiplied with the chrominance signal c(t) and then passed through the low pass filters 6 and 7 as described above, it will be apparent from Eqs. (7) and (8) that the decoded outputs $l_1(t)$ and $l_2(t)$ are produced with the chrominance signal c(t) being decoded on the axes which result from rotating the axes of the color signals $c_1$ and $c_2$ in the clockwise direction by $\theta_1$.

The decoded outputs $l_1(t)$ and $l_2(t)$ expressed by Eqs. (7) and (8) are then supplied to an encoder 20 in which they are phase-converted to a chrominance signal $c'(t)$ having a desired phase different relative to the chrominance signal $c(t)$ applied to the decoder 10.

In other words, to the terminals 8 and 9, there are supplied the decoded outputs $l_1(t)$ and $l_2(t)$ which are expressed by Eqs. (7) and (8). These outputs are supplied to and limited in band by low pass filters 13 and 14, respectively, and are then fed to third and fourth multipliers 15 and 16. From terminals 17 and 18, these multipliers 15 and 16 are supplied with first and second encode carriers $e_1(t)$ and $e_2(t)$ that are expressed by the following Eqs. (9) and (10)

$$e_1(t) = \cos(\omega_{sc}t + \theta_2) \quad (9)$$

$$e_2(t) = \sin(\omega_{sc}t + \theta_2) \quad (10)$$

where $\theta_2$ is the initial phase of the encode carriers.

Accordingly, the third and fourth multipiled outputs $m_3(t)$ and $m_4(t)$ are obtained from multipliers 15 and 16 and are expressed as $$m_3(t) = c_1(t)\cos(\omega_{sc}t+\theta_2)\cos(\theta_0+\theta_1) + c_2(t)\cos(\omega_{sc}t+\theta_2)\sin(\theta_0+\theta_1) \quad (11)$$

$$m_4(t) = -c_1(t)\sin(\omega_{sc}t+\theta_2)\sin(\theta_0+\theta_1) + c_2(t)\sin(\omega_{sc}t+\theta_2)\sin(\theta_0+\theta_1) \quad (12)$$

These multiplied outputs $m_3(t)$ and $m_4(t)$ are combined together by a composer or adder 19, and an encoded output $c'(t)$ expressed by the following Eq. (13) is developed at an output terminal 21.

$$\begin{aligned}c'(t) &= m_3(t) + m_4(t) \\ &= c_1(t)\cos(\omega_{sc}t+\theta_2)\cos(\theta_0-\theta_1) + \\ &\quad c_2(t)\cos(\omega_{sc}t+\theta_2)\sin(\theta_0-\theta_1) - \\ &\quad c_1(t)\sin(\omega_{sc}t+\theta_2)\sin(\theta_0-\theta_1) + \\ &\quad c_2(t)\sin(\omega_{sc}t+\theta_2)\cos(\theta_0-\theta_1) \\ &= c_1(t)\cos(\omega_{sc}t+\theta_2+\theta_0-\theta_1) + \\ &\quad c_2(t)\sin(\omega_{sc}t+\theta_2+\theta_0-\theta_1)\end{aligned} \quad (13)$$

As will be clear from a comparison of Eq. (1) with Eq. (13), the phase of the encoded output $c'(t)$ is displaced by $(\theta_2 - \theta_1)$ from the phase of the chrominance signal $c(t)$ applied to the decoder 10. As a result, if the initial phases $\theta_1$ and $\theta_2$ of the decode carriers $d_1(t)$ and $d_2(t)$ and the encode carriers $e_1(t)$ and $e_2(t)$, respectively, are selected properly, it is possible to desirably vary the phase of the output chrominance signal $c'(t)$ at the output of encoder 20.

This invention further develops the above described fundamental idea for chrominance phase control and applies such fundamental idea to the area of digital signal processing.

In general, if the initial phases $\theta_0$ and $\theta_1$ of the input chroma signal and the decode carrier are zero, outputs $DS_1(n)$ and $DS_2(n)$, which result from decoding a digital chrominance signal $DC(n)$ by a digital decoder forming part of a chroma phase control circuit, are expressed as $$DS_1(n) = DC(n)\cos\omega_{sc}nTs$$

$$DS_2(n) = DC(n)\sin\omega_{sc}nTs$$

where Ts is the sampling period and $Ts = 1/fs$ (fs is the sampling frequency).

Figure 4:
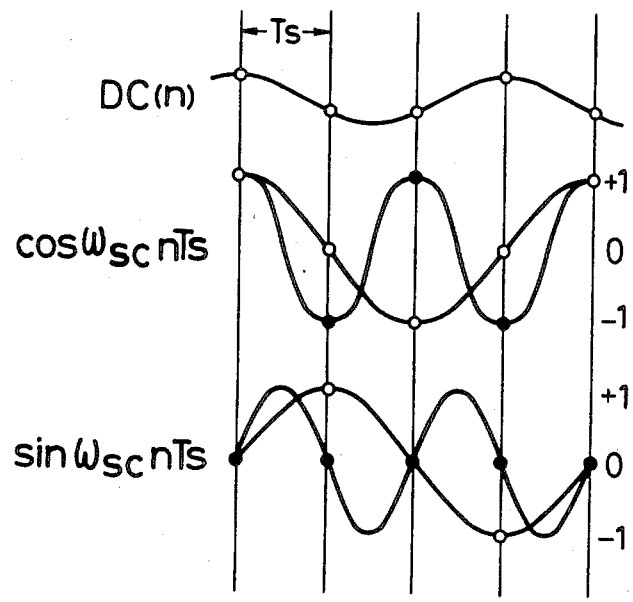
FIG. 4 is a diagram to which reference will be made in explaining the fundamental idea of the chrominance phase control operation according to this invention.
Figure 5:
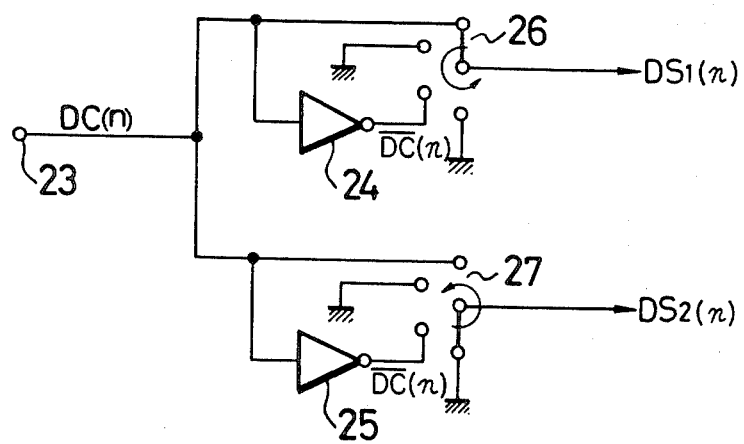
FIG. 5 is a circuit diagram of an arrangement which can realize such fundamental idea of the chrominance phase control operation explained in FIG. 4.
Figure 6:
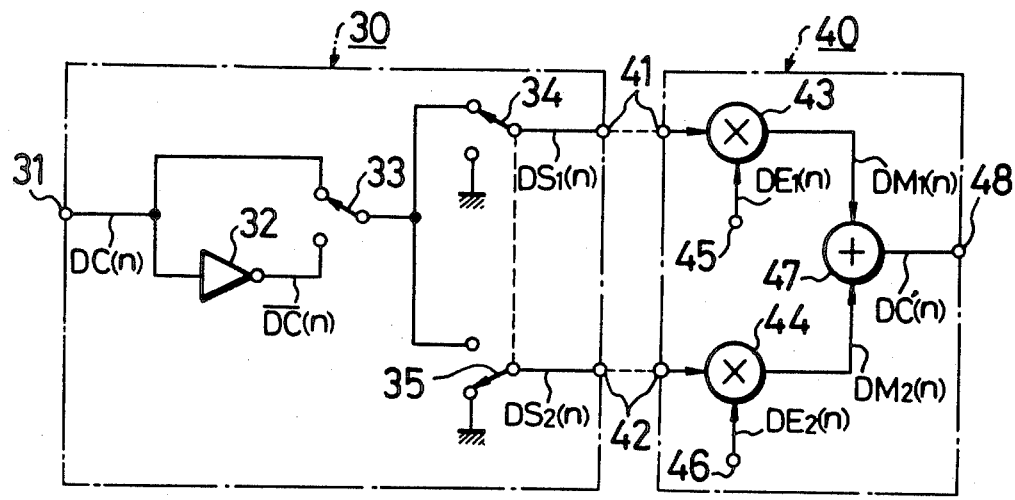
FIG. 6 is a circuit diagram showing a digital decoder and a digital encoder which constitute a digital chrominance phase control circuit according to an embodiment of the present invention.

Accordingly, as shown in FIG. 4, $DS_1(n)$ can be expressed by the values which result from sequentially multiplying $1,0,-1,0$ with $DC(n)$, while $DS_2(n)$ can be expressed by the values which result from sequentially multiplying $0,1,0,-1$ with $DC(n)$. Such sequential multiplying is schematically represented by the circuit diagram shown in FIG. 5, and in which the digital chrominance signal $DC(n)$ applied to an input terminal 23 and signals $\overline{DC}(n)$ which are obtained by phase-inverting the digital chrominance signal $DC(n)$ in code inverters 24 and 25 are supplied to respective fixed contacts of switches 26 and 27. The switches 26 and 27 are in the form of quadrapole rotary switches and the switching phases thereof are displaced by 90° from each other. The second pole and the fourth pole of each of the switches 26 and 27 are grounded, the first poles of the switches 26 and 27 are supplied with the signal $DC(n)$ and the third poles of the switches 26 and 27 are supplied with the inverted signal $\overline{DC}(n)$. The circuit of FIG. 5 employs two code inverters 24 and 25 and two quadrapole rotary switches 26 and 27, however, FIG. 6 shows one example of a relatively simpler circuit which employs only one code inverter in its decoder. More particularly, FIG. 6 illustrates an embodiment of a digital decoder 30 and a digital encoder 40 which form a digital chroma phase control circuit.

Referring in detail to FIG. 6, it will be seen that the digital decoder 30 includes a code converter 32 to invert the chrominance signal $DC(n)$ supplied thereto from a terminal 31. A code-converted chrominance signal $\overline{DC}(n)$ therefrom and the chrominance signal $DC(n)$, which is not yet code-converted, are switched by a first switching device 33. The switching rate of switching device 33 is different from the sampling rate of the chrominance signal $DC(n)$. For example, the sampling rate or frequency fs equals $2mf_{sc}$, in which m is an integer and $f_{sc}$ is the color subcarrier frequency, and the switching rate of switching device 33 is $mf_{sc}$. The output from the first switching device 33 is supplied simultaneously to second and third switching devices 34 and 35 which are oppositely phased and changed-over at the sampling rate, that is, at $2mf_{sc}$. The signals $DC(n)$ and $\overline{DC}(n)$ are alternately delivered from the first switching device 33 and the output from the first switching device 33 is distributed into the decode outputs $DS_1(n)$ and $DS_2(n)$ by the second and third switching devices 34 and 35.

The signals $DS_1(n)$ and $DS_2(n)$ will now be described more fully. With the initial phases $\theta_0$ and $\theta_1$ being zero, the decode outputs given by Eqs. (5) and (6) are rewritten as $$m_1(t) = c_1(t)(1+\cos 2\omega_{sc}t) + c_2(t)\sin 2\omega_{sc}t \quad (14)$$

$$m_2(t) = c_1(t)\sin 2\omega_{sc}t + c_2(t)(1-\cos 2\omega_{sc}t) \quad (15)$$

Since $t = nTs$, the digital decode outputs $DS_1(n)$ and $DS_2(n)$ are expressed as follows.

$$DS_1(n) = c_1(n)(1+\cos 2\omega_{sc}\cdot nTs) + C_2(n)\sin 2\omega_{sc}\cdot nTs$$

$$DS_2(n) = c_1(n)\sin 2\omega_{sc}\cdot nTs + c_2(n)(1+\cos 2\omega_{sc}\cdot nTs)$$

Further, if the sampling frequency $f_s$ is four times the subcarrier frequency $f_{sc}$, that is, $f_s = 2mf_{sc}$, and $m=2$, $$Ts = \frac{1}{4f_{sc}} = \frac{2\pi}{4\omega_{sc}}$$

is established and thus $$DS_1(n) = c_1(n)(1+\cos n\pi) + C_2(n) \sin n\pi$$

$$DS_2(n) = c_1(n) \sin n\pi + C_2(n)(1-\cos n\pi)$$

Since $\sin n\pi$ is always zero, while $\cos n\pi$ is $+1$ or $-1$ depending on the sampling position, the following Eqs. (16) and (17) are established $$DS_1(n) = c_1(n)\{1+(-1)^n\} \quad (16)$$

$$DS_2(n) = c_2(n)\{1-(-1)^n\} \quad (17)$$

Such switching outputs $DS_1(n)$ and $DS_2(n)$ expressed by Eqs. (16) and (17) are used as the decode outputs.

The first and second switching outputs $DS_1(n)$ and $DS_2(n)$ are supplied to the digital encoder 40. More specifically, the decode outputs $DS_1(n)$ and $DS_2(n)$ are supplied to terminals 41 and 42 and these outputs are multiplied with encode carriers (digital signals) $DE_1(n)$ and $DE_2(n)$ by fifth and sixth multipliers 43 and 44. The encode carriers $DE_1(n)$ and $DE_2(n)$ supplied to multipliers 43 and 44 from terminals 45 and 46, may be expressed by the following Eqs. (18) and (19)

$$DE_1(n) = \cos(\omega_{sc} \cdot nTs + \theta_2) \quad (18)$$

$$DE_2(n) = \sin(\omega_{sc} \cdot nTs + \theta_2) \quad (19)$$

The resultant first and second multiplied outputs $DM_1(n)$ and $DM_2(n)$ are combined with each other by a synthesizer or composer 47 which provides an encode output $DC'(n)$ at an output terminal 48. The multiplied outputs $DM_1(n)$ and $DM_2(n)$ and the encode output $DC'(n)$ are represented by the following Eqs. (20), (21) and (22), respectively.

$$DM_1(n) = c_1(n)\cos(\omega_{sc} \cdot nTs + \theta_2) \cos \theta_0 + \quad (20)$$
$$c_2(n)\cos(\omega_{sc} \cdot nTs + \theta_2) \sin \theta_0$$

$$DM_2(n) = -c_1(n)\sin(\omega_{sc} \cdot nTs + \theta_2) \sin \theta_0 + \quad (21)$$
$$c_2(n)\sin(\omega_{sc} \cdot nTs + \theta_2) \sin \theta_0$$

$$\therefore DC'(n) = DM_1(n) + DM_2(n) \quad (22)$$
$$= c_1(n)\cos(\omega_{sc} \cdot nTs + \theta_2 + \theta_0) +$$
$$c_2(n)\sin(\omega_{sc} \cdot nTs + \theta_2 + \theta_0)$$

From Eq. (22), it will be apparent that the phase of the digital output chrominance signal $DC'(n)$ appearing as the encoder output is different from the initial phase $\theta_0$ of the input chrominance signal by the phase $\theta_2$. Accordingly, by controlling the phase $\theta_2$ of the encode carriers $DE_1(n)$ and $DE_2(n)$, it is possible to desirably control the phase of the output chrominance signal $DC'(n)$.

As noted with reference to Eqs. (16) and (17), in the first and second switching outputs $DS_1(n)$ and $DS_2(n)$, depending on the sampling positions, $\cos n\pi$ is either $+1$ or $-1$ and $\sin n\pi$ is zero. Therefore, in the digital decoder 30, the chrominance signal $DC(n)$ and the chrominance signal $\overline{DC}(n)$ provided by code-converting the signal $DC(n)$ by the code converter 32 are supplied to the first switching device 33 and the first switching device 33 is controlled so as to alternately deliver therefrom chrominance signals $DC(n)$ and $\overline{DC}(n)$. The output of the first switching device means 33 is supplied to the second and third switching devices 34 and 35 which are switched in an interlocking fashion. The chrominance signal $\overline{DC}(n)$ must be inverted in the form of 2's complement so that an adder is used as the code converter 32.

Since the phase of the first and second switching outputs $DS_1(n)$ and $DS_2(n)$ are different from each other by 90°, when $+1$ or $-1$ is produced as an output at a certain sampling position, the other output becomes zero. This output state is alternately repeated so that each of the second and third switching devices 34 and 35 has one of its input terminals grounded.

The t ($=nTs$) of the decoder 30 is selected to be $\frac{1}{4}f_{sc}$ or $\frac{1}{2}f_{sc}$, respectively, that is, $f_s = 2mf_{sc}$ with m being 2 or 1, respectively. In this case, the switching rates of the switching devices 34 and 35 are selected to be $2mf_{sc}$, that is, $4f_{sc}$ or $f_{sc}$ when m is 2 or 1, respectively, while the switching rate of the first switching device 33 is selected to be $mf_{sc}$, that is, $2f_{sc}$ (or $f_{sc}$), respectively.

When the switching rate of switching devices 34 and 35 is selected to be $4f_{sc}$, the first and second switching outputs $DS_1(n)$ and $DS_2(n)$ and the time series n ($n=0,1,2,\ldots$) have the relationships shown on table-1 below.

TABLE - 1

| time series | first switching output $DS_1(n)$ | second switching output $DS_2(n)$ |
|---|---|---|
| 0 | $2c_1(0)\cos\theta_0 + 2c_2(0)\sin\theta_0$ | 0 |
| 1 | 0 | $-2c_1(1)\sin\theta_0 + 2c_2(1)\cos\theta_0$ |
| 2 | $2c_1(2)\cos\theta_0 + 2c_2(2)\sin\theta_0$ | 0 |
| 3 | 0 | $-2c_1(3)\sin\theta_0 + 2c_2(3)\cos\theta_0$ |
| 4 | $2c_1(4)\cos\theta_0 + 2c_2(4)\sin\theta_0$ | 0 |
| . | . | . |
| . | . | . |
| . | . | . |

Figure 7:
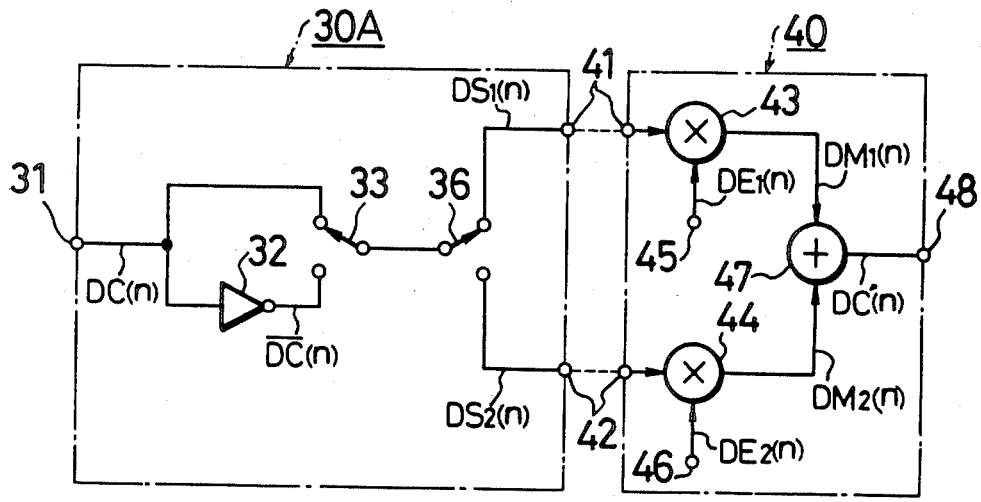
FIG. 7 is a circuit diagram showing another embodiment of the digital decoder and the digital encoder according to the present invention.

Since the first and second switching outputs $DS_1(n)$ and $DS_2(n)$ alternately become zero as indicated above, the second and third switching devices 34 and 35 on FIG. 6 can be replaced by the single switching device 36 shown in the decoder 30A on FIG. 7, and similarly switched at the rate $2mf_{sc}$.

When the output chrominance signal $DC'(n)$ having the same or opposite phase to the phase of the subcarrier of the input chrominance signal $DC(n)$ is obtained, since the respective outputs from the decoder 30 have to be code-converted at every $\frac{1}{2}f_{sc}$ or $1/f_{sc}$, respectively, it is sufficient that the digital encoder 40 carries out the exactly opposite signal processing to that of the digital decoder 30A.

Figure 8:
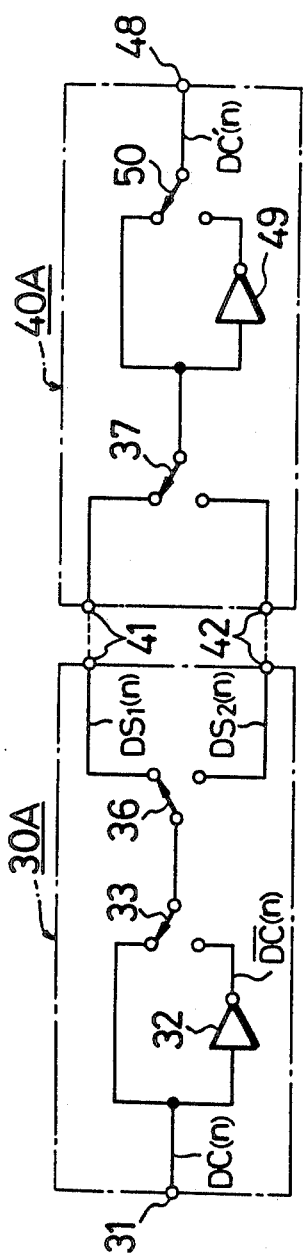
FIG. 8 is a circuit diagram showing a further embodiment of a digital decoder and digital encoder according to the present invention.

Accordingly, as shown in FIG. 8, the switching outputs $DS_1(n)$ and $DS_2(n)$ from decoder 30A are supplied to a switching device 37 of an encoder 40A which is switched at the rate $4f_{sc}$ or $2f_{sc}$, respectively. The output of switching device 37 and an output, which is provided by code-converting the same in a code converter 49, are supplied to a switching device 50 having a switching rate of $2f_{sc}$ or $f_{sc}$, respectively. If the switching phase of the switching device 50 is selected to be the same as the switching phase of the switching device 33 in the decoder 30A, are obtained chrominance signal $DC'(n)$ will have the same phase as that of the input chrominance signal. If, on the other hand, the switching phases of devices 50 and 33 are selected to be opposed, the phase-inverted chrominance signal $\overline{DC'(n)}$ can be obtained.

According to the circuit arrangement of FIG. 8, the first and second switching outputs $DS_1(n)$ and $DS_2(n)$ can be produced alternately so that these switching outputs $DS_1(n)$ and $DS_2(n)$ can be frequency-multiplexed in a time-division manner.

Figure 9:
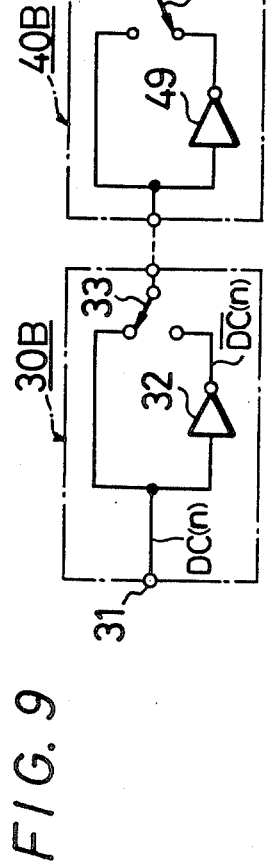
FIG. 9 is a circuit diagram showing a phase control circuit according to a further embodiment of the present invention which can carry out a time-division frequency multiplexing operation.

FIG. 9 shows one example of a circuit which can effect the frequency-multiplexing operation in a time-division manner. In FIG. 9, like parts corresponding to those of FIG. 8 are marked with the same references and will not be further described. Further, the switching means 36 and 37 are not required and so they are removed from the decoder 30B and encoder 40B of FIG. 9.

Figure 10:
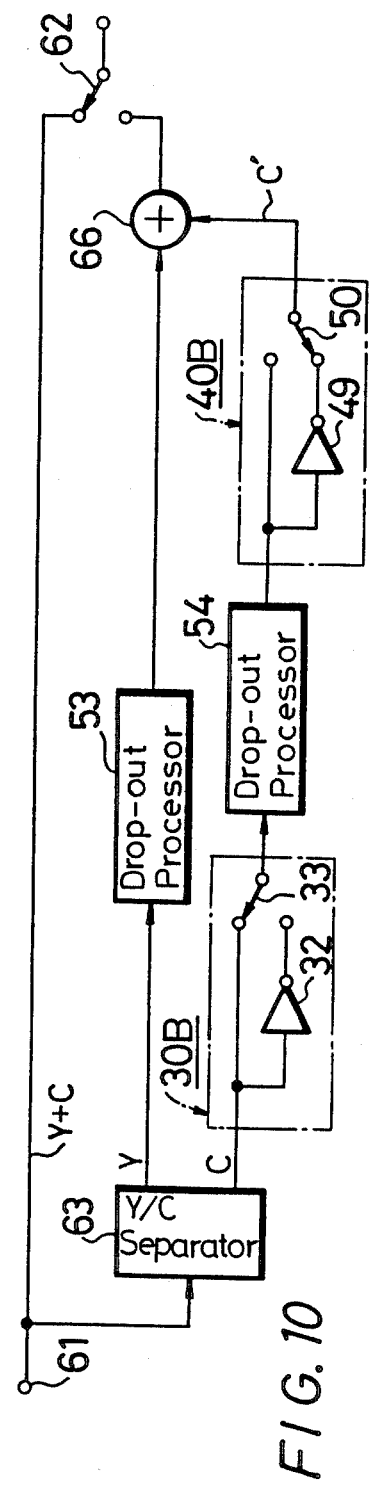
FIG. 10 is a block diagram showing the phase control circuit of FIG. 9 applied to a drop-out compensation circuit as the chroma inverter.

FIG. 10 shows an example of the application of the phase control circuit shown in FIG. 9 as a chroma inverter in a drop-out compensation system. In FIG. 10, reference numerals 53 and 54 designate processors formed, for example, of 1H memories and so on, and used to compensate for the drop-out of the luminance and chrominance, respectively. In the system of FIG. 10, the digital decoder 30B of FIG. 9 is connected in advance of the drop-out processor 54 provided in the chroma signal channel, and, as the succeeding stage of the drop-out processor 54, there is connected the digital encoder 40B also shown in FIG. 9. When the phase of the chrominance signal C' is to be inverted, the switching phases of the switching devices 33 and 50 are controlled to become opposite to each other.

When the digital chrominance signal DC(n) includes a velocity error, the initial phase $\theta_0$ of the digital chroma signal DC(n) becomes the value $\theta_0(n)$ which is changed with time. In such case, when the digital chrominance signal DC(n) is passed through the above described phase control circuit, it is encoded so as to contain the velocity error. Accordingly, the encode output DC'(n) corresponding to Eq. (22) is expressed as $$DC'(n) = c_1(n) \cos(\omega_{sc} \cdot nTs + \theta_2(n)) + c_2(n) \sin(\omega_{sc} \cdot nTs + \theta_2(n)) \quad (23)$$

Although preferred embodiments of the invention have been described in detail above, it will be apparent that many modifications and variations could be effected therein by one skilled in the art without departing from the spirit or scope of the invention as defined by the appended claims.

What is claimed is:

1. A phase control circuit for an input digital chrominance signal which is sampled with a sampling frequency of $2mf_{sc}$ wherein m is an integer and $f_{sc}$ is a color subcarrier frequency, comprising:

decoder means for converting said input digital chrominance signal into digital chrominance components, said decoder means including first inverting means for inverting said input digital chrominance signal, and first switch means for switching between said input digital chrominance signal and an output of said inverting means at a first switching rate of $mf_{sc}$ to sequentially produce said digital chrominance components multiplexed in a time-division manner at the output thereof;

single transmitting line means for transmitting the multiplexed digital chrominance components from said decoder means; and encoder means for converting said digital chrominance components into an output digital chrominance signal, said encoder means comprising second inverting means for inverting said digital chrominance components from said single transmitting line means, and second switch means for switching between the output of said second inverting means and said digital chrominance components from said single transmitting line means at a second switching rate of $mf_{sc}$, with the relative switching phases of said first and second switch means being controlled for determining the phase of said output digital chrominance signal.

2. A phase control circuit according to claim 1; in which said first switch means has an opposite phase to said second switch means, whereby the phase of said output digital chrominance signal is different by 180° from that of said input digital chrominance signal.

3. A phase control circuit according to claim 1; in which said integer m is 2.

* * * * *